United States Patent
Murakami et al.

(10) Patent No.: US 7,882,256 B2
(45) Date of Patent: Feb. 1, 2011

(54) GATEWAY DEVICE AND CONTROL DEVICE

(75) Inventors: Takashi Murakami, Osaka (JP);
Yasuyuki Shintani, Singapore (SG)

(73) Assignee: Panasonic Corporation, Osaka (JP)

( * ) Notice: Subject to any disclaimer, the term of this patent is extended or adjusted under 35 U.S.C. 154(b) by 603 days.

(21) Appl. No.: 11/915,181

(22) PCT Filed: Apr. 21, 2006

(86) PCT No.: PCT/JP2006/008442

§ 371 (c)(1),
(2), (4) Date: Nov. 21, 2007

(87) PCT Pub. No.: WO2006/126355

PCT Pub. Date: Nov. 30, 2006

(65) Prior Publication Data

US 2010/0004763 A1    Jan. 7, 2010

(30) Foreign Application Priority Data

May 24, 2005 (JP) .............................. 2005-151600
Jun. 20, 2005 (JP) .............................. 2005-179992

(51) Int. Cl.
*G06F 15/16* (2006.01)
(52) U.S. Cl. .................. 709/230; 709/223; 709/229; 709/245
(58) Field of Classification Search .............. 709/229, 709/230, 223, 245
See application file for complete search history.

(56) References Cited

U.S. PATENT DOCUMENTS

| | | | | |
|---|---|---|---|---|
| 6,457,060 | B1 * | 9/2002 | Martin et al. | 709/245 |
| 6,963,925 | B1 | 11/2005 | Ishikawa et al. | |
| 7,188,191 | B1 * | 3/2007 | Hovell et al. | 709/245 |
| 2002/0188713 | A1 * | 12/2002 | Bloch et al. | 709/223 |
| 2003/0154297 | A1 * | 8/2003 | Suzuki et al. | 709/229 |
| 2004/0019686 | A1 * | 1/2004 | Toyoda et al. | 709/229 |

FOREIGN PATENT DOCUMENTS

| | | |
|---|---|---|
| EP | 1 063 829 | 12/2000 |
| JP | 2001-007861 | 1/2001 |
| JP | 2001-290724 | 10/2001 |

OTHER PUBLICATIONS

International Search Report issued Jul. 25, 2006 in the International (PCT) Application of which the present application is the U.S. National Stage.

* cited by examiner

*Primary Examiner*—Liangche A Wang
(74) *Attorney, Agent, or Firm*—Wenderoth, Lind & Ponack, L.L.P.

(57) ABSTRACT

The present invention provides a gateway device releasing information and service information of an appliance to an appliance connected to a network having a different protocol. The gateway device includes a device description creation processing unit, a device description template holding unit, a service description creation processing unit, and a service description template holding unit. The service description creation processing unit categorizes services and attributes that each appliance can provide into property types, which are control models, and based on a rule defined for each property type, a service information description, which is information to be released, is automatically created.

12 Claims, 17 Drawing Sheets

FIG. 5

| Protocol A (UPnP) | Protocol B (ECHONET) |
|---|---|
| ECHONET_AirConditioner | 0x0130 |
| ECHONET_Refrigerator | 0x03B7 |
| ECHONET_WashingMachine | 0x03D3 |
| ECHONET_MicroWaveOven | 0x03B8 |

| Appliance name | Protocol A(UPnP) | | Protocol B(ECHONET) | |
|---|---|---|---|---|
| | Attribute | Data | Attribute | Data |
| Common | Status | ON | 0x80 | 0x30 |
| Common | Status | OFF | 0x80 | 0x31 |
| Common | Place | Living | 0x81 | 0x01 |
| Common | Place | Kitchen | 0x81 | 0x11 |
| Common | Place | Bath | 0x81 | 0x20 |
| Common | ProductDate | 20050525 | 0x8E | 0x07D50519 |
| Common | | | | |

| Appliance name | Protocol A(UPnP) | | Protocol B(ECHONET) | |
|---|---|---|---|---|
| | Attribute | Data | Attribute | Data |
| ECHONET_Air Conditioner | SetTemperature | AnalogValue | 0xB3 | AnalogValue |
| ECHONET_Air Conditioner | Mode | Auto | 0xB0 | 0x41 |
| ECHONET_Air Conditioner | Mode | Cooling | 0xB1 | 0x42 |
| ECHONET_Air Conditioner | Mode | Heating | 0xB1 | 0x43 |
| ECHONET_Refrigerator | DoorStatus | Open | 0xB0 | 0x41 |
| ECHONET_Refrigerator | DoorStatus | Close | 0xB0 | 0x42 |

| UPnP | ECHONET | |
|---|---|---|
| Appliance information | ECHONET address | ECHONET object |
| AirConditioner1 | 0x0102 | 0x013001 |
| AirConditioner2 | 0x0104 | 0x013001 |
| Refrigerator1 | 0x0109 | 0x03B701 |

| Property type | Remarks |
|---|---|
| Numeric value type | Controlling/referring to numeric value |
| Date type | Controlling/referring to date related |
| Time type | Controlling/referring to time |
| Level type | Controlling/referring to level |
| Character representation type | Represented by character string and no option of EDT |
| Reset type | There is an option of EDT, and access rule is limited to "Set" |
| Switch type | Two options of EDT |
| Selection type | Three or more options of EDT |
| Combination type | Others |

| Property type | Type categorization | Object | Action prefix | dataType |
|---|---|---|---|---|
| Numeric value type | AVR / Value type | Type of numeric value | Set / Get | ui1, ui2, ui4, i1, i2, i4, float |
| Date type | Date type | Date | Set / Get | Date |
| Time type | Date type | Time | Set / Get | Time |
| Level type | ------- | Level | Write / Read | ------- |
| Character representation type | String type | Code | Set / Get | String |
| Reset type | AVL type | : : | Reset | String |
| Switch type | AVL type | Status | Select / Refer | String |
| Selection type | AVL type | Status | Select / Refer | String |

FIG. 13    Device description template 1300

```
<?xml version="1.0"?>
<root xmlns="urn:echonet-gr-jp:device-1-0">
  <specVersion>
    <major>1</major>
    <minor>0</minor>
  </specVersion>
  <URLBase>base URL for all relative URLs</URLBase>
  <device>
    <deviceType>urn:echonet-gr-jp:device:ECHONET_Appliance:1</deviceType> ~1301
    - - - -
    <serviceList>
      <service>
        <serviceType>urn:echonet-gr-jp:service:ECHONET_Service:1</serviceType>
        <serviceId>urn:echonet-gr-jp:serviceId:ECHONET_Appliance</serviceId> ~1302
        <SCPDURL>URL to service description</SCPDURL> ~1303
        <controlURL>URL for control</controlURL>
        <eventSubURL>URL for eventing</eventSubURL> ~1304
      </service>
    </serviceList>
    <deviceList />
    <presentationURL>URL for presentation</presentationURL>
  </device>
</root>
```

FIG. 14

Service description template 1400

```xml
<?xml version="1.0"?>
<scpd xmlns="urn:echonet-gr-jp:service-1-0">
   <specVersion>
      <major>1</major>
      <minor>0</minor>
   </specVersion>
<actionList>
 <!--Numeric value type, Date type, Time type, Character representation type-->
   <action>
    <name>SetVariableName</name>  —1401
      <argumentList>
         <argument>
           <name>NewVariableName</name>
             <direction>in</direction>
      <relatedStateVariable>VariableName</relatedStateVariable>
         </argument>
      </argumentList>
```

⋮

```xml
<!--Level type-->
 <action>                         1402
  <name>WriteVariableName</name>
    <argumentList>
       <argument>
        <name>NewVariableName</name>
          <direction>in</direction>
   <relatedStateVariable>VariableName</relatedStateVariable>
       </argument>
    </argumentList>
 </action>
```

⋮

```xml
<!--Switch type-->
 <action>
  <name>ChooseVariableName</name>
     <argumentList>
        <argument>
          <name>NewVariableName</name>
           <direction>in</direction>
 <relatedStateVariable>VariableName</relatedStateVariable>
     </argument>
    </argumentList>
 </action>
```

FIG. 16A    Level type
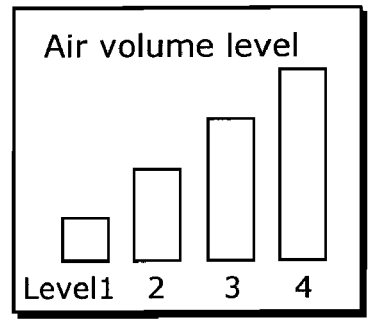
FIG. 16B    Selection type
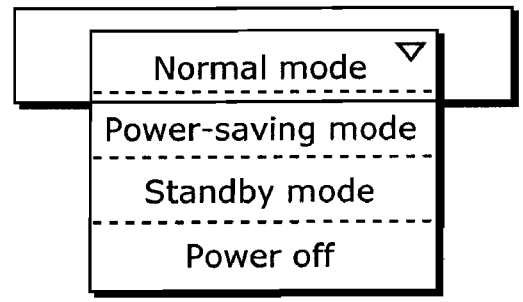
FIG. 16C    Switch type
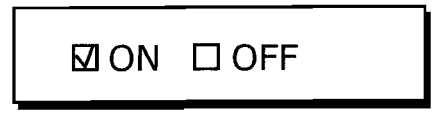
FIG. 16D    Character representation type
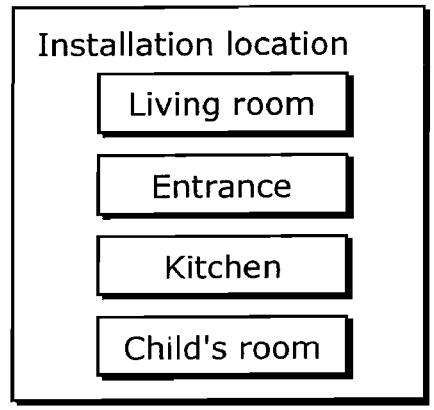

GATEWAY DEVICE AND CONTROL DEVICE

BACKGROUND OF THE INVENTION

1. Field of Invention

The present invention relates to a gateway device and the like that connects networks having different protocols, to which a control device and a terminal appliance that is a non-control device are connected, and particularly to a gateway device and the like provided with a method for releasing, to the control device connected to a network having a protocol which is different from the protocol of the terminal appliance, information of the terminal appliance such as: a connection state to the network that the terminal appliance is connected to; and service that each terminal appliance can provide; and the attribute.

2. Description of the Related Art

Conventionally, systems have been described, the system in which: an application, a service and a device each creates a description of one's own ability; such description is released to other applications, other services, and other devices; various different networks are integrated into a unified framework; and various network entities each located in such networks find and interact with each other.

In addition, for example, a method is disclosed in which a user application can find various network devices and use such devices by integrating networks having different communication protocols into a single framework. (For example, please refer to Patent Reference 1.)

In addition, specifically, in recent years, network support for information appliances and audio-video appliances is in progress, and for example, the Universal Plug and Play (UPnP) draws attention as a communication protocol to be used for such appliances, and the product application is already underway. From now on, as an ECHONET appliance, which uses, for example, the ECHONET that is a communication protocol in a home, has been systematized by integrating it with information appliances and audio-video appliances, it is desired that a UPnP device can be used also in such system.

Patent Reference 1: Japanese Unexamined Patent Application No. 2001-290724 Publication

BRIEF SUMMARY OF THE INVENTION

Problems that Invention is to Solve

However, conventionally, even when information of an appliance connected to an own network and information related to an attribute and data which the appliance provides are released to a network having a different protocol, enormous amount of operations are required, as the released data is defined for each appliance. In addition, even when different protocols determine a definition for an identical appliance, there is a problem that the respective definitions may become different. Thus, it is quite difficult to develop a control device that controls appliances each connected to networks having different protocols.

In addition, specifically, in order to realize a linkage operation between the aforementioned ECHONET appliance and an audio-video appliance in a home, a gateway function that interconnects an ECHONET protocol to a UPnP protocol for an audio-video appliance is necessary. However, as specific gateway functions have not been standardized in the current ECHONET specification, there is also a problem that the linkage operation between an ECHONET appliance and an audio-video appliance in a home can not be achieved.

The present invention is conceived in order to solve the aforementioned problems, and the object is to provide a gateway device that can appropriately realize an interconnection between terminal appliances connected to different communication networks having different protocols, by standardizing the gateway functions and making them into a specification of the gateway functions.

Means to Solve the Problems

In order to solve the aforementioned problems, the gateway device according to the present invention is the gateway device that connects two or more networks having different protocols, the protocols including at least a first protocol and a second protocol, and the gateway device includes: a template holding unit which holds a template which is described based on a standard used for the second protocol and in which information regarding a terminal appliance connected to a network having the first protocol is to be written; an obtainment unit that obtains, from the terminal appliance connected to the network having the first protocol, the information regarding the terminal appliance which is based on a standard used for the first protocol; a template description creation processing unit that creates a terminal appliance information description by obtaining the template held in the template holding unit and writing the information regarding the terminal appliance in the template, the information being obtained by the obtainment unit; a protocol conversion table holding unit which holds a protocol conversion table in which representation formats of the information corresponding to the terminal appliances in the first protocol and the second protocol respectively are associated with names of the terminal appliances; a protocol conversion unit that converts a protocol in the case where a control device connected to the network having the second protocol performs communications with the terminal appliance connected to the network having the first protocol by referring to the protocol conversion table; and a communication unit that transmits the terminal appliance information description to the control device connected to the network having the second protocol, the description being updated by the template description creation processing unit.

In addition, in the gateway device according to the present invention, wherein the template holding unit includes: a device description template holding unit which holds a device description template which is described based on the standard used for the second protocol and in which device information of the terminal appliance connected to the network having the first protocol is to be written; and service description template holding unit which holds a service description template which is described based on the standard used for the second protocol and in which service information provided by the terminal appliance is to be written, and the template description creation processing unit includes: a device description creation processing unit that creates a device information description by obtaining the device description template from the device description template holding unit and automatically writing the device information in the device description template according to a predetermined rule, the information being obtained by the obtainment unit; and a service description creation processing unit that creates a service information description by obtaining the service description template from the service description template holding unit and automatically writing the service information in the service description template according to the predetermined rule, the information being obtained by the obtainment unit.

With these configurations, the template description creation processing unit can automatically create the terminal appliance information description suited for the standard of the second protocol and release it to the control device connected to the network having the second protocol, based on information regarding the terminal appliance which is described in the template suited for the standard of the first protocol obtained by the terminal appliance connected to the first protocol. Thus, it is possible to realize the gateway device that can interconnect terminal appliances connected to networks having different protocols.

In addition, the service description template holding unit in the gateway device according to the present invention holds a service description template defined by each property type which is a control model categorized into a pattern of controlling the terminal appliance connected to the network having the first protocol, and the service description creation processing unit categorizes information regarding a service obtained by the obtainment unit into the property types which are defined beforehand according to a predetermined rule, selects a service description template corresponding to each of the property types from the service description template holding unit, and creates the service information description according to a rule defined for each of the service description templates.

With this configuration, the service description creation processing unit categorizes attributes and services held in each appliance, in other words, terminal appliances, and attribute information and service information of the terminal appliances into the property types which are control models, creates the service information description based on the standard of the second protocol, and releases this service information description to the control device connected to the network having the second protocol. By doing so, it is possible to easily release, to the terminal appliances connected to different networks, the device information including the network configuration and the service information that each terminal appliance can provide.

Furthermore, the gateway device according to the present invention includes an Internet connection unit that connects to the Internet and obtains, from a server device, the protocol conversion table, the device description template, and the service description template which respectively correspond to the terminal appliance connected to the first protocol.

With this configuration, the Internet connection unit can obtain via the Internet: the protocol conversion table in which representation formats for each protocol are associated with names of the terminal appliances and the service that the terminal appliances provide; the device description template for creating the device information description; and the service description template for creating the service information description. In the case where new service or a new terminal appliance is added, by obtaining a new template via a network, the gateway device can appropriately connect networks having different protocols.

In addition, the control device according to the present invention is the control device which controls terminal appliances connected to a network having a first protocol and connects to a network having a second protocol, and the control device includes: a device description detection processing unit that confirms a connection state of a terminal appliance to be controlled which is connected to the network having the first protocol, that detects whether or not the terminal appliance to be controlled is connected to the network, and that holds a device information description which is device information of the obtained terminal appliance; a device analysis processing unit that analyzes the device information description; a service description detection processing unit that requests and obtains a service information description to and from the terminal appliance connected to the network having the first protocol, the description describing the service information held by the terminal appliance to be controlled; a service analysis processing unit that analyzes the service information description; an event receiving processing unit that analyzes details of received notification data by obtaining the device information description from the device description detection processing unit and the service information description from the service description detection processing unit, when the control device receives the notification data regarding a state of the terminal appliance from the terminal appliance to be controlled; a device control processing unit that creates communication data for controlling the terminal appliance to be controlled by obtaining the device information description from the device description detection processing unit and the service information description from the service description detection processing unit; a data holding unit which holds the device information description and service information description for at least all of the terminal appliances to be controlled; and a screen display unit that displays a screen so that a user can confirm and control a state of the terminal appliance based on the device information description and the service information description of the terminal appliance to be controlled.

In addition, the screen display unit in the control device according to the present invention holds a widget set for generating a screen framework for each property type of the service information description, generates the screen framework by applying the widget set to a screen, and generates the screen by writing data in the widget set according to a rule of the widget set, the data being included in the service information description.

With these configurations, when the control device connected to a different network receives the service information description which is released, the screen display unit can easily create a user interface by using the widget set corresponding to each property type that is a control model. In addition, the method in the control device according to the present invention is not limited to a particular protocol but can be used for any interconnections between different protocols.

It should be noted that the present invention can be realized, not only as a network connection method having the characteristic units of the gateway device as steps, but also as a program causing a computer to execute such steps. It is obvious that such program can be distributed via a recording medium, such as a CD-ROM and the like, and via a transmission medium, such as the Internet and the like.

EFFECTS OF THE INVENTION

The present invention introduces a method for releasing a connection state of an appliance and a service that each appliance can provide to an appliance connected to a network having a different protocol by just categorizing services of each appliance into property types that are control models in the gateway device of the present invention. With this, the service that each appliance provides can be easily released to an appliance connected to a network having a different protocol, and an interconnection between terminal appliances connected to communication networks having different protocols can appropriately be realized.

In addition, a control device which receives service information of terminal appliances each connected to different networks can easily create applications which create a template for categorizing properties of the appliances into property types, as long as it holds a component for a user interface corresponding to the property types that are control models.

BRIEF DESCRIPTION OF DRAWINGS

FIG. 5 is a protocol conversion table in which a name of a appliance is converted.

FIG. 6 is a protocol conversion table used in common for terminal appliances, in which attributes and data are converted.

FIG. 7 is a protocol conversion table in which attributes and data are converted for each terminal appliance.

FIG. 8 is a diagram of an address conversion table.

FIG. 11 is an example showing ECHONET property types categorized in the gateway device according to the first embodiment.

FIG. 12 is a reference diagram showing correspondences between the property types and the type categorization, object, Action prefix, and dataType, regarding categorization based on the ECHONET property types and the naming rule.

FIG. 13 is a diagram showing an example of a format of a device description template held in the device description template holding unit of the gateway device in the first embodiment.

FIG. 14 is a diagram showing an example of a format of a service description template held in the service description template holding unit of the gateway device in the first embodiment.

FIG. 16A is an example of a level type of a screen displayed on the screen display unit of the control device in the second embodiment.

FIG. 16B is an example of a selection type of a screen displayed on the screen display unit of the control device in the second embodiment.

FIG. 16C is an example of a switch type of a screen displayed on the screen display unit of the control device in the second embodiment.

FIG. 16D is an example of a character representation type of a screen displayed on the screen display unit of the control device in the second embodiment.

DETAILED DESCRIPTION OF THE INVENTION

The embodiments of the present invention are described hereinafter with reference to the diagrams.

First Embodiment

Figure 1:
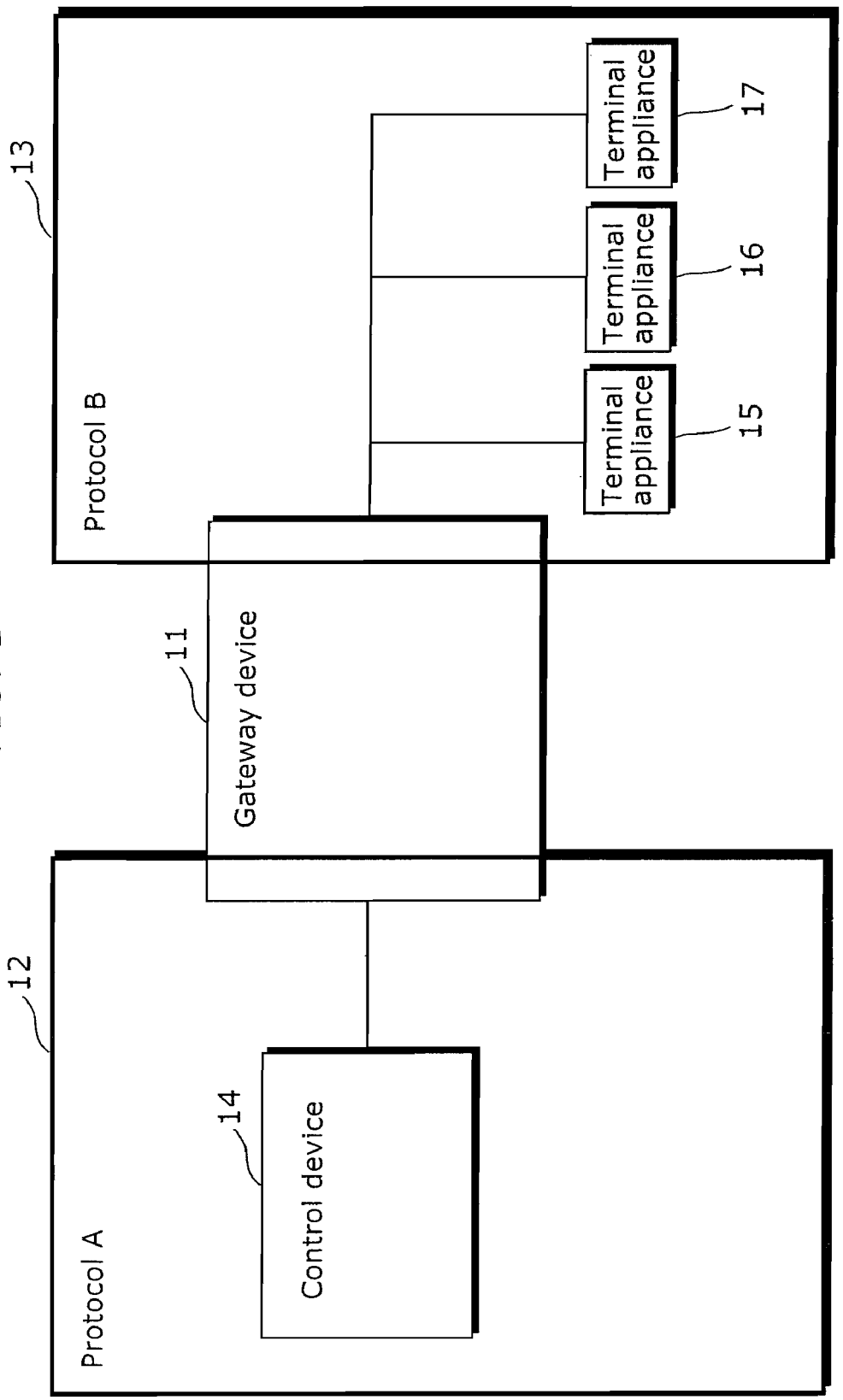
FIG. 1 is a system block diagram when networks having different kinds of protocols are interconnected.

FIG. 1 is a system block diagram of a home network having plural kinds of protocols in a home network according to the first embodiment of the present invention.

FIG. 1 shows two kinds of protocols, and for example, a protocol A 12 is referred to as the UPnP, and a protocol B 13 is referred to as ECHONET. As a configuration of the home network, a control device 14 is connected to the protocol A 12, and a terminal appliance 15, a terminal appliance 16, and a terminal appliance 17 are connected to the protocol B 13.

The terminal appliances 15, 16, and 17 are appliances, for example, an air-conditioner and a refrigerator-freezer. Furthermore, a gateway device 11 connected to both the protocol A 12 and protocol B 13 constructs a home network system. The control device 14 connected to the protocol A 12 and the terminal appliances 15, 16, and 17 connected to the protocol B 13 realize an interconnection between networks having different kinds of protocols via the gateway device 11.

The control device 14 obtains, from the gateway device 11, information of an appliance connected to the protocol B 13 and information of services that each appliance can execute. Based on such information, the control device 14 transmits, to the gateway device 11, communication data for controlling the appliance connected to the protocol B 13. Then, the gateway device 11 converts the received communication data into communication data corresponding to the protocol B 13, and transmits the communication data to the terminal appliance 15 connected to the corresponding protocol B 13.

In addition, there are cases where the terminal appliance 15 connected to the protocol B 13 notifies a state regularly or a state when a state of the terminal appliance 15 is changed. The gateway device 11 converts the received communication data into communication data corresponding to the protocol A 12, and transmits the communication data to the control device 14 connected to the protocol A 12.

In addition, when the gateway device 11 detects that a new appliance is connected to the protocol B 13, the gateway device 11 transmits notification data indicating that the new appliance is connected to the protocol B 13 to the protocol A 12. Then, the control device 14 that has received the notification data inquires of the gateway device 11 about a service that the new appliance can provide and obtains the response so that the control device 14 can control an appliance newly connected to.

Figure 2:
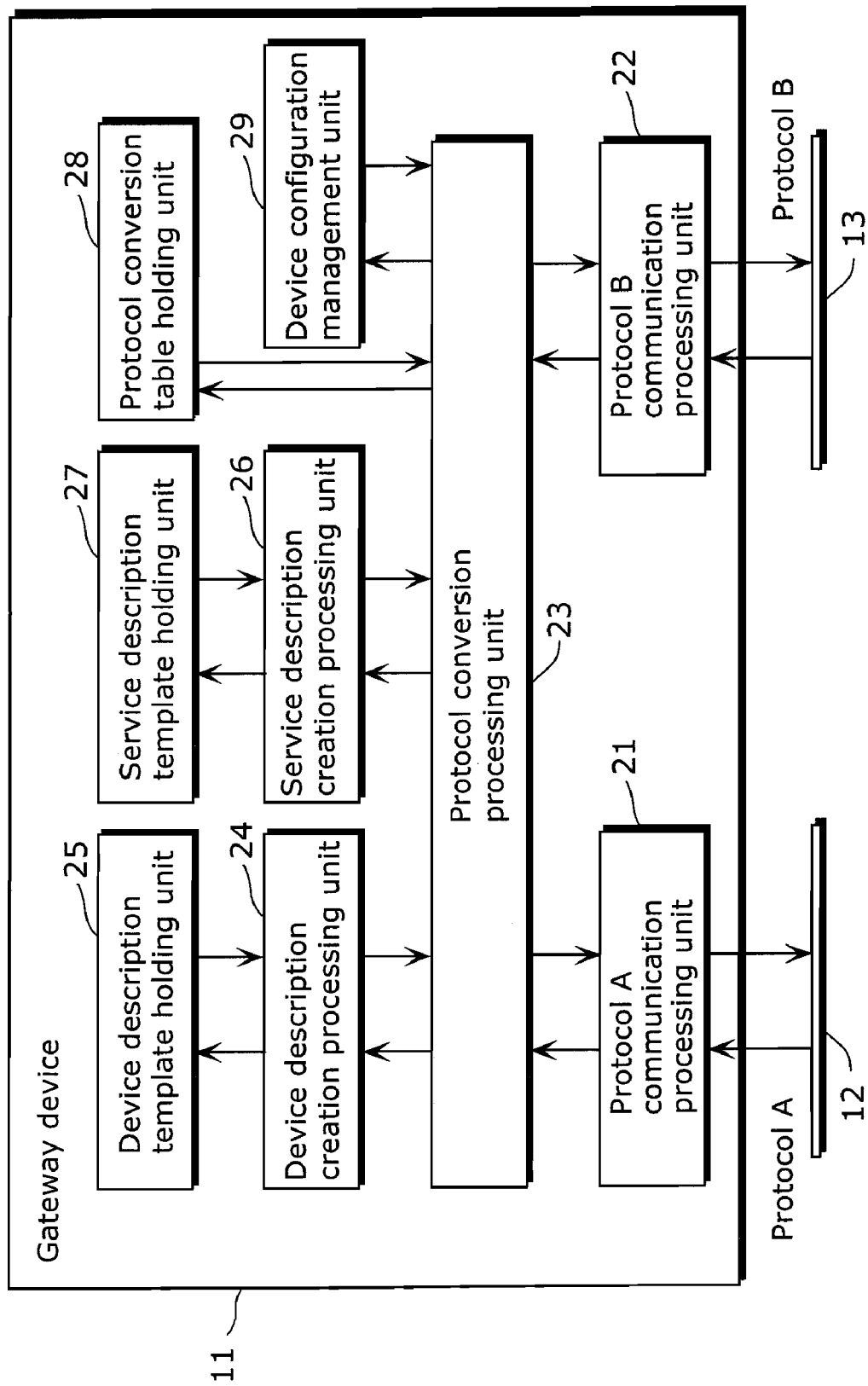
FIG. 2 is a functional block diagram held by the gateway device.

FIG. 2 is a diagram showing a protocol stack of the gateway device 11 connected to networks having different kinds of protocols in the home network according to the first embodiment of the present invention. In this FIG. 2, for example, the gateway device 11 is connected to two different kinds of protocols, the protocol A 12 and protocol B 13.

The gateway device 11 includes a protocol A communication processing unit 21, a protocol B communication processing unit 22, a protocol conversion processing unit 23, a device description creation processing unit 24, a device description template holding unit 25, a service description creation processing unit 26, a service description template holding unit 27, a protocol conversion table holding unit 28, and a device configuration management unit 29.

The protocol A communication processing unit 21 holds a function of transmitting and receiving communication data to and from other appliances connected to the protocol A 12, and upon receipt of data from the protocol conversion processing unit 23, the protocol A communication processing unit 21 converts the communication data into a communication template of the protocol A 12, and transmits the communication data to other appliances connected to the protocol A 12. In addition, in the case where the protocol A communication processing unit 21 receives communication data from other appliances connected to the protocol A 12, after analyzing the received communication data, the protocol A communication processing unit 21 passes the data to the protocol conversion processing unit 23.

The protocol B communication processing unit 22 holds a function for transmitting and receiving communication data to and from other appliances connected to the protocol B 13, and upon receipt of data from the protocol conversion processing unit 23, the protocol B communication processing unit 22 converts the communication data into a communication template of the protocol B 13, and transmits the communication data to other appliances connected to the protocol B 13. In addition, in the case where the protocol B communication processing unit 22 receives communication data from other appliances connected to the protocol B 13, after analyzing the received communication data, the protocol B communication processing unit 22 passes the data to the protocol conversion processing unit 23.

Next, the case where information and a service of an appliance connected to the protocol B 13 are released to the protocol A 12 will be described hereinafter.

In the case where the gateway device 11 receives, from the control device connected to the protocol A 12, communication data requesting device information data (specifically, a device information description to be described hereinafter) which describes a configuration of an appliance connected to the protocol B 13, the protocol conversion processing unit 23 receives, from the device description creation processing unit 24, the device information data which describes information of the appliance connected to the protocol B 13 in XML, and passes the data to the protocol A communication processing unit 21 in order to respond the device information data to the control device 14 which transmits the communication data and requests the device information data.

Next, in the case where the gateway device 11 receives, from the control device 14 connected to the protocol A 12, communication data requesting service information data (specifically, a service information description to be described hereinafter) that describes a service which each appliance connected to the protocol B 13 can provide, the protocol conversion processing unit 23 receives, from the service description creation processing unit 26, the service information data which describes, in XML, service information which each appliance connected to the protocol B 13 holds, and passes the data to the protocol A communication processing unit 21 in order to respond the service information data to the control device 14 which transmits the communication data and requests the service information data.

Next, in the case where the gateway device 11 receives, from the control device connected to the protocol A 12, control data requesting control to an appliance connected to the protocol B, the protocol conversion processing unit 23 receives, from the protocol conversion table holding unit 28 to be described hereinafter, information for converting the control data from data for the protocol A 12 to data for the protocol B 13, and receives, from the device configuration management unit 29 to be described hereinafter, an address of the corresponding appliance for the protocol B 13. Then, the protocol conversion processing unit 23 converts the address, a name of the appliance, attribute, data, and the like, and passes the control data to the protocol B communication processing unit 22 in order to control the appliance connected to the protocol B 13.

Next, in the case where the gateway device 11 receives, from the appliance connected to the protocol B 13, notification data notifying a state of the appliance, the protocol conversion processing unit 23 receives, from the protocol conversion table holding unit 28, information for converting the control data from the data for the protocol B 13 to the data for the protocol A 12, and receives, from the device configuration management unit 29, information for converting an address for the protocol B 13 to an address for the protocol A 12 of the corresponding appliance. Then, the protocol conversion processing unit 23 converts the address, the name of the appliance, attribute, data, and the like, and passes notification data to the protocol A communication processing unit 21 in order to notify the control device connected to the protocol A 12 of data of the appliance connected to the protocol B 13.

In addition, in the case where the protocol conversion processing unit 23 receives, from the protocol B communication processing unit 22, information that the appliance is connected to the protocol B 13, it passes the information to the device description creation processing unit 24 and the device configuration management unit 29.

In addition, in the case where the protocol conversion processing unit 23 receives information of the appliance, such as the manufacturer and a serial number of the appliance, likewise, it passes the received data to the device description creation processing unit 24.

In addition, in the case where the protocol conversion processing unit 23 receives, from the protocol B communication processing unit 22, information that the appliance is connected to the protocol B 13, it passes the information to the device description creation processing unit 24 and the device configuration management unit 29.

In addition, in the case where the protocol conversion processing unit 23 obtains, from the appliance connected to the protocol B 13, information related to data which can be controlled by the appliance connected to the protocol B 13, it passes the received data to the service description creation processing unit 26.

The device description creation processing unit 24 creates device information data in which a system of the protocol B 13 is a root device and the terminal appliance 15 connected to the protocol B 13 is a built-in device. When the device description creation processing unit 24 obtains information that an appliance is newly connected to the protocol B 13, it obtains, from the device description template holding unit 25 to be described hereinafter, a template for creating the device information data, and creates the device information data according to a predetermined conversion rule. In the case where the device information data is created or updated, the device description creation processing unit 24 passes the device information data to the protocol conversion processing unit 23. In addition, in the case where the device description creation processing unit 24 receives a request for obtaining the device information data from the protocol conversion processing unit 23, the device description creation processing unit 24 passes the device information data to the protocol conversion processing unit 23. For example, the device information data is data described in XML, indicating a configuration of an appliance connected to the protocol B 13.

The service description creation processing unit 26 creates service information data about a service which the terminal appliance 15 connected to the protocol B 13 can provide, the attribute, and a data value. The attribute is data indicating control objects, such as an operation state and an installation location, and the available service is data indicating control, state reference, and whether or not there is any event. Furthermore, the data indicates specific control values, such as on or off of an operation state. When the service description creation processing unit 26 obtains information of the appliance connected to the protocol B 13, such as a service, an attribute, and data, it passes the device information and the attribute to the service description template holding unit 27 to be described hereinafter, and obtains, from the service description template holding unit 27, a template corresponding to the appliance and the attribute in order to create service information data. Then, the service description creation processing unit 26 creates the service information data according to a predetermined conversion rule defined for each template. In the case where the service description creation processing unit 26 receives a request for obtaining the service information from the protocol conversion processing unit 23, the service information data is passed to the protocol conversion processing unit 23. For example, the service information data is data described in XML, indicating the service which can be provided by the appliance connected to the protocol B 13, the attribute, and the data value.

The device description template holding unit 25 holds a template in order that the device description creation processing unit 24 may create device information data in which a system of the protocol B 13 is a root device, and the terminal appliance 15 connected to the protocol B 13 is a built-in device. When the device description template holding unit 25 receives, from the device description creation processing unit 24, an obtainment request of a template for creating the device information data, it passes the template to the device description creation processing unit 24. For example, the template for creating the device information data is described in XML.

The service description template holding unit 27 holds a template of service information data for creating a service which the terminal appliance 15 connected to the protocol B 13 can provide, the attribute, and the data value. Thus, the gateway device can model control patterns by categorizing the patterns that control the appliances.

In addition, the service description template holding unit 27 holds a template of service information data for every modeled control pattern. As examples, the following shows the four templates which the service description template holding unit 27 holds: a template for attributes which holds data which is a switch type, on or off, likewise an operation state; a template for attributes indicating a list of data corresponding to the attributes, for example, installation locations, such as a living room, an entrance, and a kitchen; a template for attributes which holds analog value as data, such as a preset temperature; and a template which integrates a plurality of attributes into a single template, for example, timer-related attributes, such as a timer-on setting, timer-on setting time, time-off setting, and timer-off setting time are integrated. As such, the service description template holding unit 27 holds a template, and upon receipt of an obtainment request of a template for creating service information data as well as data regarding an appliance and the attribute from the service description creation processing unit 26, the service description template holding unit 27 passes a template suited for the attribute to the service description creation processing unit 26. For example, the template for creating the service information data is described in XML.

The protocol conversion table holding unit 28 converts a description language of the protocol A 12 to a description language of the protocol B 13 according to a request of the protocol conversion processing unit 23 so as to pass data to the protocol conversion processing unit 23. Likewise, it converts the description language of the protocol B 13 to the description language of the protocol A 12 so as to pass data to the protocol conversion processing unit 23.

The protocol conversion table holding unit 28 holds two kinds of tables. One is a device name conversion table 51 that is created for the conversion rule in the protocol A 12 and protocol B 13 regarding a name of an appliance. An example of the device name conversion table 51 is shown in FIG. 5. The other kind is attribute conversion tables 61 and 71 that are created for the conversion rule in the protocol A 12 and protocol B 13 regarding an attribute and data corresponding to the attribute. A specific example of the attribute conversion tables are shown in FIG. 6 and FIG. 7. The attribute conversion table 71 shows attributes and conversion rule of data for every appliance. In addition, in the attribute conversion table 61 which describes attributes used commonly for every appliance, such as an operation state and an installation location, "Common" is put in the column of an appliance name so as to indicate that the appliance is common, not a name of the appliance.

The device configuration management unit 29 holds a configuration of an appliance connected to the protocol B 13 as an address conversion table 81. An example of the address conversion table is shown in FIG. 8.

For example, in the case where the terminal appliance 15 is controlled from the control device 14 and where the gateway device transfers, to the control device, notification data transmitted by the terminal appliance 15, the protocol conversion processing unit 23 obtains address conversion information from the device configuration management unit 29. For example, in the case where the control device 14 controls the terminal appliance 15, the address conversion information indicates that the address conversion table 81 is referred to and device information is converted into a pair of an ECHONET address and an ECHONET object. In the case where the terminal appliance 15 notifies the control device 14 of the state, the address conversion information indicates that the address conversion table 81 is referred to and a pair of an ECHONET address and an ECHONET object is converted into device information.

In addition, the gateway device 11 according to the first embodiment is characterized in that the ECHONET properties are categorized according to details of property values and the categorized result is defined as a property type, in consideration of the construction of an application in a UPnP control point. The ECHONET properties can be categorized into the following eight property types, and the categorization is based on a categorization rule as described hereinafter. FIG. 11 is a diagram showing an example of a categorized ECHONET property type in the gateway device 11 of the first embodiment. Each property type is described hereinafter.

(1) a numeric value type: This property is indicated by a property value using a numeric value. The data type varies, depending on the possible range of numeric values. Specifically, the data type is decided based on: whether or not the value is an integer value; whether there is any value after the decimal point; whether or not any sign is attached; or a byte size of the data.

(2) a date type: This property holds data indicating a date. Data Type is Date. The data format described in XML Description conforms to ISO 8601 format, and is described as yyyy-mm-dd (year-month-date).

(3) a time type: This property holds time. Data Type is Time. The data format described in XML Description conforms to ISO 8601 format, and is described as yyyy-mm-dd (year-month-date).

(4) a level type: This property controls an ECHONET appliance by data indicating a magnitude relationship expressed by a non-numeric value, and refers to a state of the ECHONET appliance. For example, it is true for a detection threshold level. Data Type is String.

(5) a character representation type: This property is indicated by data obtaining from an ECHONET appliance or data to be controlled by the ECHONET appliance, and each of the data is a character string. For example, the property is an article code or a serial number. Data Type is String.

(6) a reset type: This property is used in the case where a certain state of the terminal appliance is reset by controlling the ECHONET appliance using a single defined value. Data Type is String.

(7) a switch type: This property is to control the ECHONET appliance by switching two different values, or to obtain one of the two values from the ECHONET appliance. For example, the property is an operation state, and occurrence of an abnormal state. Data Type is String.

(8) a selection type: This property is to control the ECHONET appliance by selecting a value from among three or more different values, and to obtain one of the values which are three or more from the ECHONET appliance. For example, the property is an installation location. Data Type is String.

In this manner, the gateway device 11 according to the first embodiment performs categorization by the ECHONET property types, and this "categorization by the ECHONET property types" indicates that the ECHONET property types are categorized according to details of a property value, and the property type is defined for every ECHONET property. Furthermore, a naming rule of VariableName and Action is defined for every property type. In addition, even when a new appliance is added in the system, the gateway device can automatically make an application, as the application holds a service description template, which is a model of an application, for every defined property type.

FIG. 12 is a reference diagram showing correspondences between property types and the type categorizations, objects, Action prefixes or datatypes, regarding categorization by the ECHONET property types and the naming rule.

In the gateway device 11, when an ECHONET appliance releases an executable service to a UPnP network, it is necessary to define constituent elements of XML Service Description, dataType, a naming rule of VariableName, a naming rule of Action in order to allow the ECHONET properties automatically to be mapped to XML Service Description. "A naming rule of VariableName and a naming rule of Action" can perform mapping by the categorization according to the ECHONET property types. In addition, "a constituent element, dataType" can perform mapping by the categorization according to the data type of the ECHONET property.

Moreover, naming criteria of VariableName are that: there is no mismatching as VariableName of the UPnP; a name is automatically assigned; the meaning can be inferred as English words; and the number of characters does not surpass 32 characters including an Action prefix. Therefore, VariableName is created according to the rule shown hereinafter.

First, an "object" showing details of a property is provided for each property type as described in FIG. 12. VariableName is determined by dividing a property name into words which have meaning respectively, arranging the words sequentially from the head, and adding an object defined in FIG. 12 to the end. These naming results are described in Appendix B which is the ECHONET specification.

In addition, the naming rule of Action is to add VariableName to Action prefix.

In addition, DataType is defined based on categorization of data types. The dataTypes of AVR type and Value type are judged by the range of values for an ECHONET property and the data size. In addition, likewise, it is determined whether the dataType is Data type or Time type by details of the ECHONET property.

FIG. 13 is a diagram showing an example of a format of a device description template 1300 held in the device description template holding unit 25 of the gateway device 11 in the first embodiment. It should be noted that a specification of each element conforms to UPnP Device Architecture Ver. 1.0.

As an element unique to the ECHONET, a domain name described in an device description template 1300 is assumed to be "echonet-gr-jp". In addition, an element name "UDN" will be described. In the case where an ECHONET-UPnP gateway detects connections to a network having the ECHONET appliance, a UUID is described in the device description template 1300 so as to make it unique to the ECHONET appliance. Furthermore, in addition to XML description of a conventional device template, 1301 that is a description for identifying a type of an ECHONET appliance, and 1302-1304 that are descriptions about address information of the ECHONET appliance are added.

Moreover, the device description template 1300 may be registered in advance in manufacturing the gateway device 11, or there is a method for obtaining it from outside via a network. In addition, the gateway device 11 makes the device description creation processing unit 24 write, in the device description template 1300, the device information obtained from a terminal appliance at the protocol A side so as to create a device information description and release the description to the control device which performs communications based on the UPnP of the protocol A side. With this, the control device can obtain device information of a terminal appliance connected to the protocol B side.

FIG. 14 is a diagram showing an example of a format description of a service description template 1400 held in the service description template holding unit 27 of the gateway device 11 in the first embodiment.

A format of the service description template 1400 to be used is determined, depending on the ECHONET property type. It should be noted that a specification of each element conforms to UPnP Device Architecture Ver. 1.0. As an element unique to the ECHONET, a domain name described in the service description template 1400 is assumed to be "echonet-gr-jp". In addition, in the case where the property type is one of the numeric value type, the date type, the time type and the character representation type as shown in the diagram, <name>SetVariableName</name> (1401) is described, and in the case of level type, <name>WriteVariableName</name> (1402) is described. In the service description creation processing unit 26 of the gateway device 11, by automatically overwriting such description based on template information, described based on the ECHONET specification, which is obtained from the terminal appliance at the protocol B side, a service description template is created. Then, the control device can obtain service information of the terminal appliance connected to the protocol B side by releasing this service information description to the control device which performs communications based on the UPnP at the protocol A side.

Figure 15:
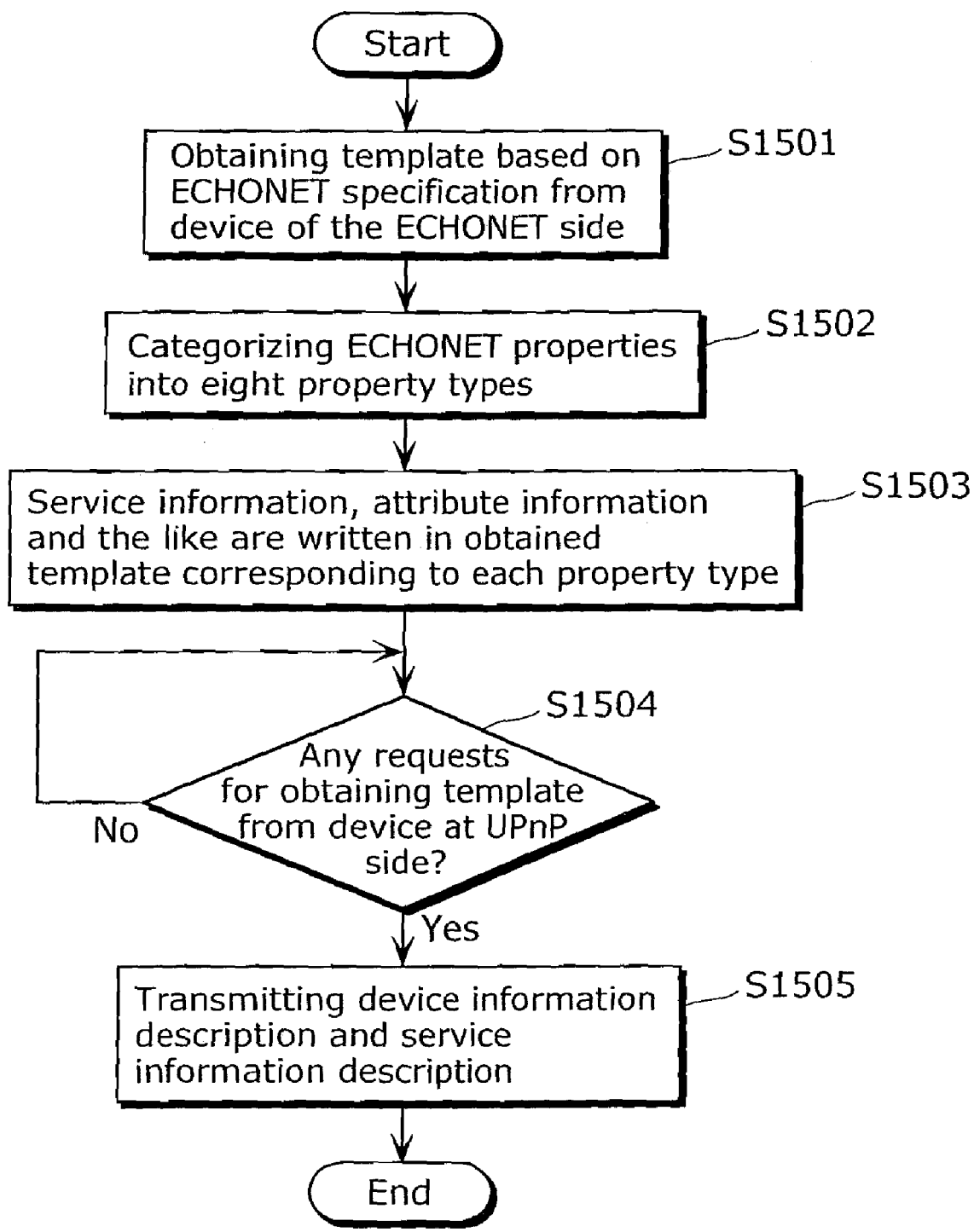
FIG. 15 is a flowchart showing an operation procedure of the gateway device in the first embodiment.

FIG. 15 is a flowchart showing an operation procedure of the gateway device 11 according to the first embodiment.

First, a template that describes terminal information in accordance with the ECHONET specification is obtained from an appliance at the ECHONET side (S1501). Next, ECHONET properties which are terminal information are categorized into eight property types in the gateway device 11 (S1502). Then, in the device description creation processing unit 24 and the service description creation processing unit 26, a template corresponding to each property type is obtained, and service information, attribute information, and the like are written in the template (S1503). Next, it is confirmed whether or not a control device at the UPnP side which is protocol A side issues a request for obtaining each template (S1504), and in the case where there is an obtainment request (Yes at S1504), the device information description and service information description created in S1503 are transmitted to the control device (S1505).

Figure 10:
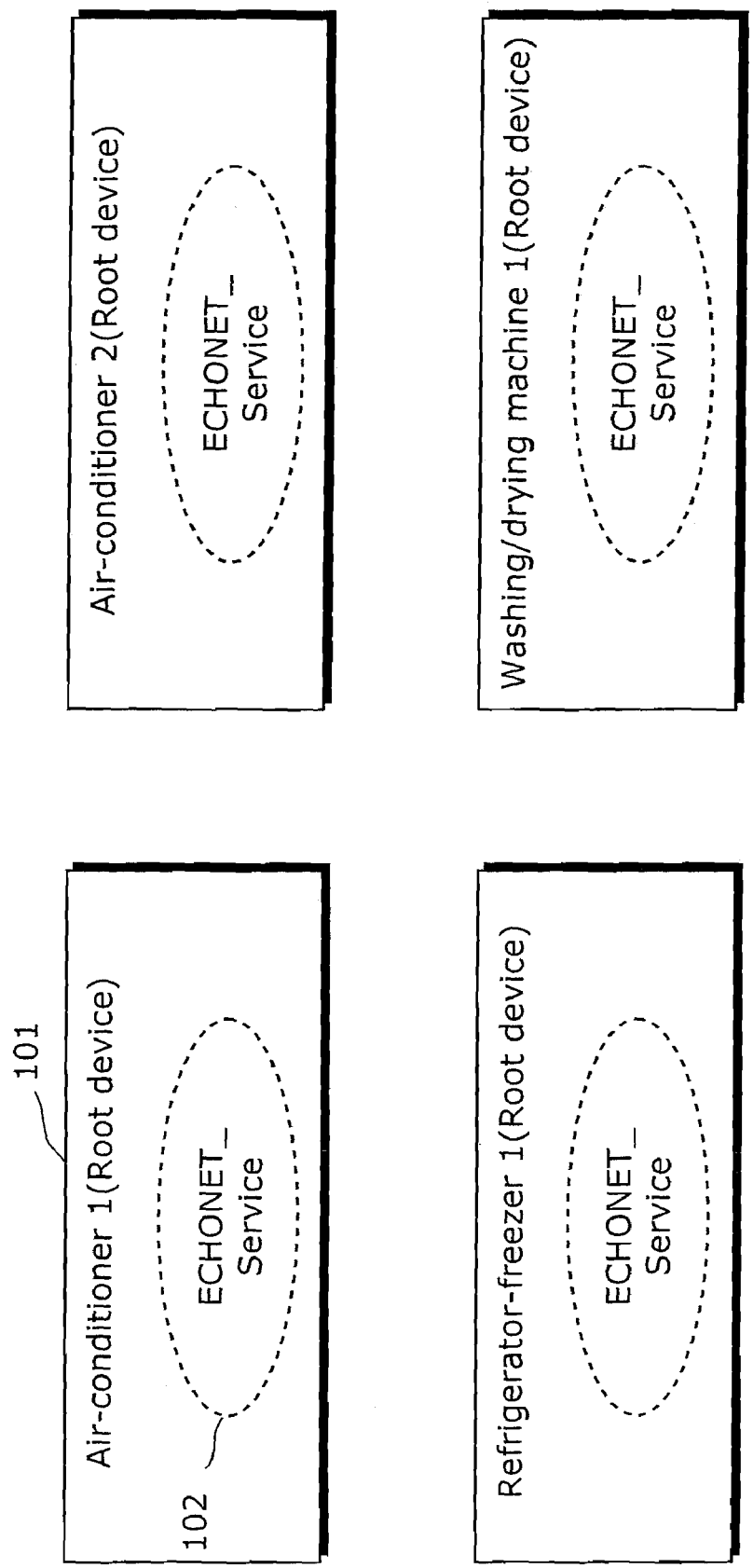
FIG. 10 is an image diagram in the case where information of ECHONET appliances is released to the UPnP.

FIG. 10 describes a method for releasing information of the ECHONET appliances to an appliance in the UPnP via a home network according to the first embodiment of the present invention.

FIG. 10 shows a case when two air-conditioners, one refrigerator-freezer, and one washing/drying machine are connected each other. A device template is created in order to integrate information of each ECHONET appliance into information for releasing to an appliance connected on the UPnP. As a design policy for releasing information of an ECHONET appliance to the UPnP side, information of an ECHONET appliance is released to the UPnP by describing that each ECHONET appliance is a root device 101. Each ECHONET appliance holds the service type with a name of ECHONET_Service 102.

First, a name of an ECHONET appliance is defined. A device type is defined as ECHONET_Appliance in order to release a root device, in other words, an ECHONET appliance to the UPnP. Actually, when information of each ECHONET appliance is released to the UPnP, a name unique to the ECHONET appliance is written in a part of Appliance in the device description template 1300 of FIG. 13. For example, in the case where an air-conditioner is released, "ECHONET_HomeAirConditioner" is described.

Next, the service description template 1400 as shown in the aforementioned FIG. 14 is defined in order to integrate service information held in each ECHONET appliance into information for releasing to an appliance connected to the UPnP. The name of a service type held by an ECHONET appliance is defined as ECHONET_Service 102. The service type defines VariableName for every pattern for controlling an ECHONET appliance. VariableName is described by combining a pattern name for controlling an appliance with an ECHONET property name. By toggling two values likewise, for example, ON/OFF, VariableName is defined as Switch_property in the case of a pattern for controlling an appliance.

For example, this control pattern is true for an operation state and the like. In addition, in the case of controlling an appliance using a positive integer, VariableName is defined as AnalogValue_ui1_property. For example, this control pattern is true for a preset temperature of an air-conditioner and the like. In addition, in the case of a pattern for controlling an appliance using positive and negative integers, VariableName is defined as AnalogValue_i1_property. For example, this control pattern is true for an outdoor temperature and the like. In addition, in the case where an appliance is controlled by selecting one of data from plurality of options of data, VariableName is defined as DataList_property. For example, this control pattern is true for setting an operating mode of an air-conditioner and the like. It should be noted that the aforementioned control not only includes controlling an appliance but also referring to a state of the appliance. The character string inputted in "Property" is a name of an ECHONET property. For example, in the case where a name of an ECHONET property which is in the operation state is Status, VariableName is described as "Switch_Status".

Next, Action in controlling an appliance, Action in referring to a state of the appliance, and the argument are defined for the defined VariableName.

First, as a naming rule of Action in the case of controlling an appliance, Set is used as a prefix of a "name of a controlling pattern". Action is, for example, "SetSwitch", "SetAnalogValue_ui1", "SetAnalogValue_i1", and "SetDataList". Then, Argument, which is a necessary argument for controlling an appliance and the naming rule of relatedStateVariable are defined. In the naming rule of Argument, New is used as a prefix of a "name and property of a controlling pattern". For example, in the case where a name of a pattern for controlling an appliance is Switch, NewSwitch_property is described. In addition, in the case of a pattern of controlling other appliances, "NewAnalogValue_ui1_property", "NewAnalogValue_i1_property", and "NewDataList_property" are respectively described. The character string inputted in "property" is an ECHONET property name. Taking an operation state, for example, as property is Status, Argument becomes NewSwitch_Status. The naming rule of relatedStateVariable is, as in the case of VariableName, is to describe it by combining a pattern name for controlling an appliance with an ECHONET property name.

Next, as the naming rule of Action in the case of referring to a state of an appliance, Get is used as a prefix of a "name of a controlling pattern". Action is, for example, "GetSwitch", "GetAnalogValue_ui1", "GetAnalogValue_i1", and "GetDataList". Then, Argument which is a necessary argument for controlling an appliance, and the naming rule of relatedStateVariable are defined. In the naming rule of Argument, Current is used as a prefix of a "name and property of a controlling pattern". For example, in the case where a name of a pattern for controlling an appliance is Switch, CurrentSwitch_property is described. In addition, in the case of a pattern for controlling other appliances, "CurrentAnalogValue_µl_property", "CurrentAnalogValue_i1_property", and "CurrentDataList_property" are respectively described. The character string inputted in "property" is an ECHONET property name. Taking an operation state, for example, as property is Status, Argument becomes CurrentSwitch_Status. The naming rule of relatedStateVariable is, as in the case of VariableName, to describe it by combining a pattern name for controlling an appliance with an ECHONET property name.

As described above, in the gateway device 11 of the first embodiment, without defining parameters for each appliance, such as Appliance and property regarding information of an ECHONET appliance and service information held in the appliance, instead, by defining such parameters as a common parameter, a device template and a service template which are common to the ECHONET appliance can be created.

Furthermore, by automatically mapping information of an ECHONET appliance and service information held by the appliance, it is possible to automatically create information for releasing to an appliance connected to the UPnP. Therefore, when information of an appliance and the service held by the appliance are newly defined in the ECHONET protocol, by automatically mapping information, it is possible to release information of the appliance and service information to the UPnP side.

In addition, as described above, the service information description for releasing device information and service information of a UPnP virtual device in the gateway device 11 is created according to a predetermined rule, and this predetermined rule is defined for every property type which categorizes the ECHONET properties. Therefore, even when a new appliance is standardized, by just categorizing the ECHONET properties into the property types, it is possible to automatically map from the ECHONET properties to a service information description that is XML Description, and to realize an interconnection between terminal appliances respectively connected to communication networks based on different kinds of protocols by standardizing gateway functions and making them into a specification of the gateway functions.

Second Embodiment

The second embodiment of the present invention is described hereinafter with reference to the diagrams.

Figure 3:
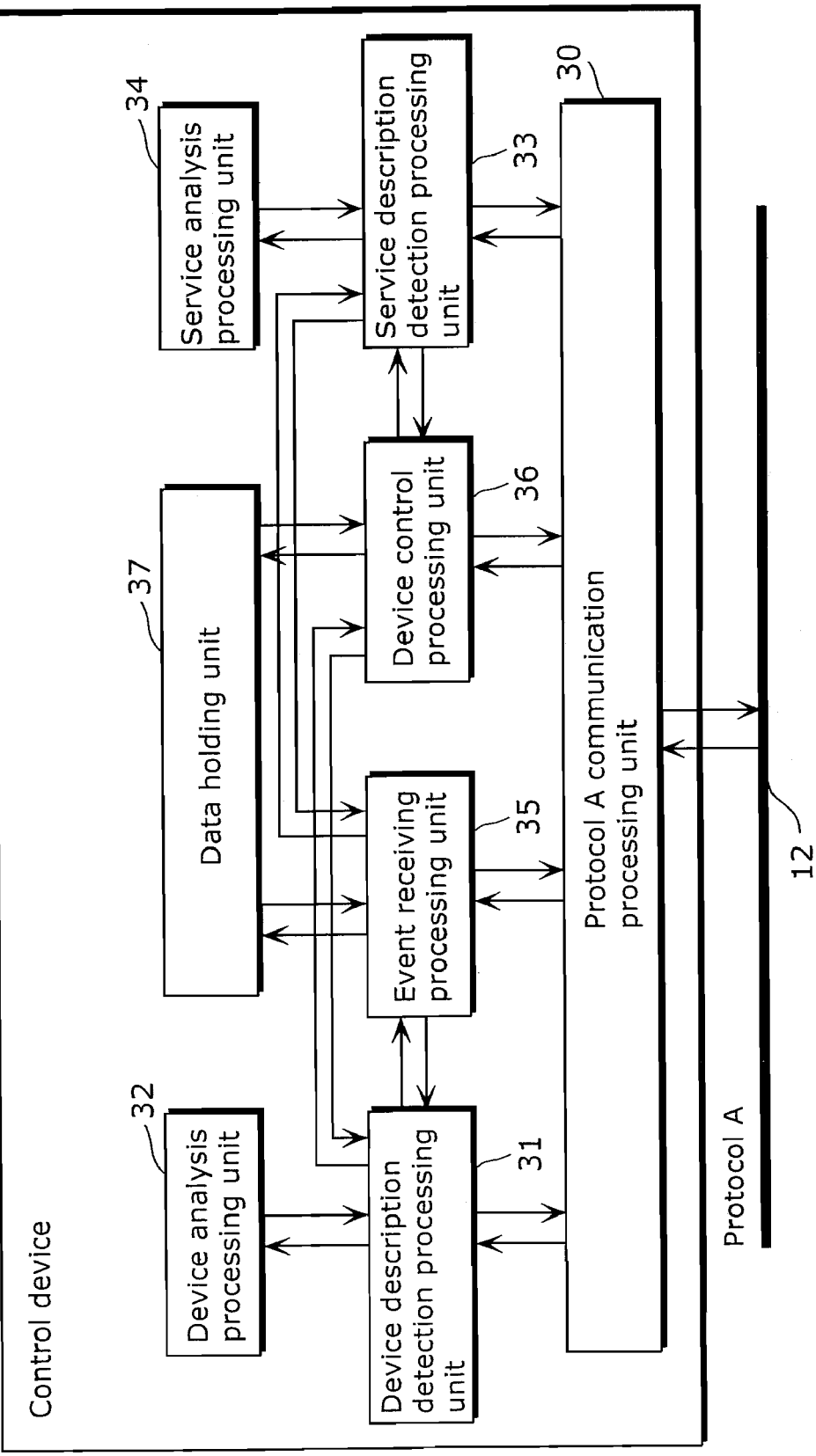
FIG. 3 is a functional block diagram held by the control device.

In a home network having the second embodiment of the present invention, FIG. 3 is a diagram showing a protocol stack of the control device 14 connected to a network having a protocol which is different from the protocol of the terminal appliance 15 to be controlled.

The control device 14 includes a protocol A communication processing unit 30, a device description detection processing unit 31, a device analysis processing unit 32, a service description detection processing unit 33, a service analysis processing unit 34, an event receiving processing unit 35, a device control processing unit 36, and a data holding unit 37.

When the control device 14 is connected to a network, the device description detection processing unit 31 transmits discovery request data in order to detect an appliance connected to a network, and upon receipt of discovery response data, the device description detection processing unit 31 passes the discovery response data to the device analysis processing unit 32 to be described hereinafter, and receives a result analyzed by the device analysis processing unit 32. In addition, in the case where the device description detection processing unit 31 receives information that an appliance is connected to a network, it passes the received data to the device analysis processing unit 32, and the device analysis processing unit 32 receives the analyzed result.

The device analysis processing unit 32 analyzes the data received from the device description detection processing unit 31, analyzes the system configuration and the connected appliance, and passes the analyzed result to the device description detection processing unit 31. For example, this data is created in XML, and the device analysis processing unit 32 holds an XML parser function which analyzes XML.

After the control device 14 detects the appliance connected to the network, or after the control device 14 detects information which notifies that an appliance to be connected to the network is connected to the network, the service description detection processing unit 33 requests the corresponding appliance to release the attribute and the service that can be provided, and obtains such information. Then, the service description detection processing unit 33 passes, to the service analysis processing unit 34, the released information such as the attribute and the service which are obtained, and the service analysis processing unit 34 receives the analyzed result.

The service analysis processing unit 34 analyzes the data received from the service description detection processing unit 33, analyzes an attribute and a service which an appliance to be controlled can provide, and passes the analyzed result to the service description detection processing unit 33. For example, this data is created in XML, and the service analysis processing unit 34 holds an XML parser function which analyzes XML.

When the event receiving processing unit 35 receives notification data transmitted by other appliances, it passes the notification data to the device description detection processing unit 31 and the service description detection processing unit 33, obtains information of the appliance which transmits the notification data, the attribute and data value of the notification data, and passes them to the data holding unit 37 to be described hereinafter.

In controlling an appliance, the device control processing unit 36 obtains, from the processing unit 31, information, such as an address of an appliance to be controlled, obtains an attribute and a data value of the appliance to be controlled from the service description detection processing unit 33, and transmits control request data to the appliance to be controlled. In addition, in the case where the device control processing unit 36 receives a response from the appliance to be controlled, it passes the control result to the data holding unit 37.

The data holding unit 37 holds an attribute of the appliance controlled by the control device 14 and the current data value corresponding to the attribute.

Figure 4:
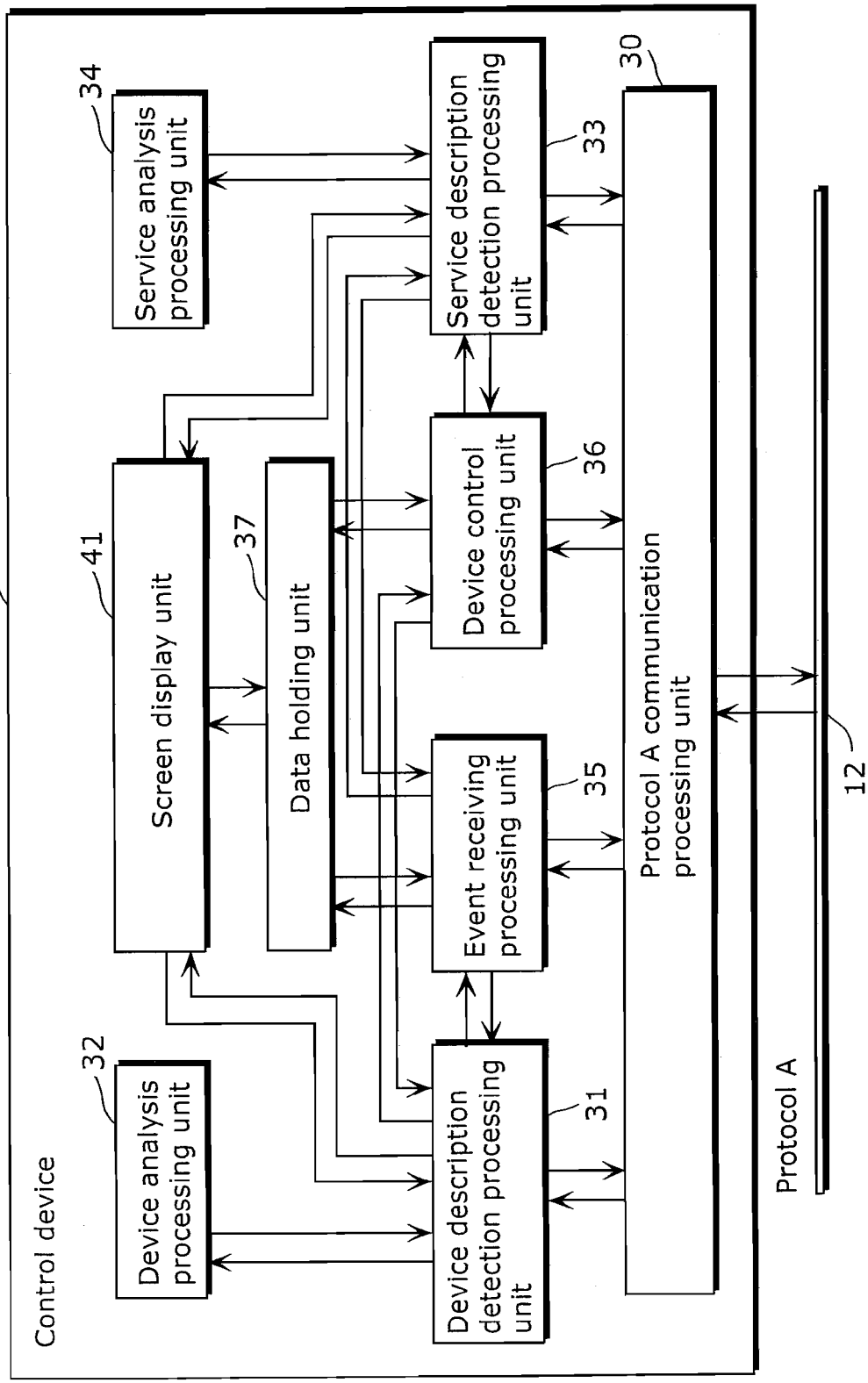
FIG. 4 is a functional block diagram held by the control device.

FIG. 4 is a diagram, in a home network having the second embodiment of the present invention, showing a protocol stack of the control device 14 connected to a network having a protocol different from the protocol of the terminal appliance 15 to be controlled.

The control device 14 shown in FIG. 4 holds a screen display unit 41 for displaying, to the user, a configuration and a state of the appliance, in addition to the configuration of the control device 14 shown in FIG. 3. The screen display unit 41 holds a function for displaying a screen so that the user can control the terminal appliance 15, the terminal appliance 16, and the terminal appliance 17.

The screen display unit 41 determines a screen configuration to be displayed by receiving service information data from the service description detection processing unit 33. In other words, the service information data is a control model into which the controlling patterns are categorized. The screen display unit 41 holds a widget set for every control model, and by applying this widget set to a screen, it is possible to generate a framework of the screen. Furthermore, by writing, in the widget set; information such as a name of an appliance obtained from the device description detection processing unit 31; the attribute of the appliance to be controlled obtained from the service description detection processing unit 33; and data of the appliance to be controlled obtained from the data holding unit 37, the screen display unit 41 can generate a screen.

FIG. 16 is an example of a screen displayed on the screen display unit 41 of the control device 14 according to the second embodiment. The screen created by the aforementioned method, for example, as shown in FIGS. 16A to 16D, can be a screen display corresponding to each of the ECHONET property types (level type, selection type, switch type, and character representation type).

Figure 17:
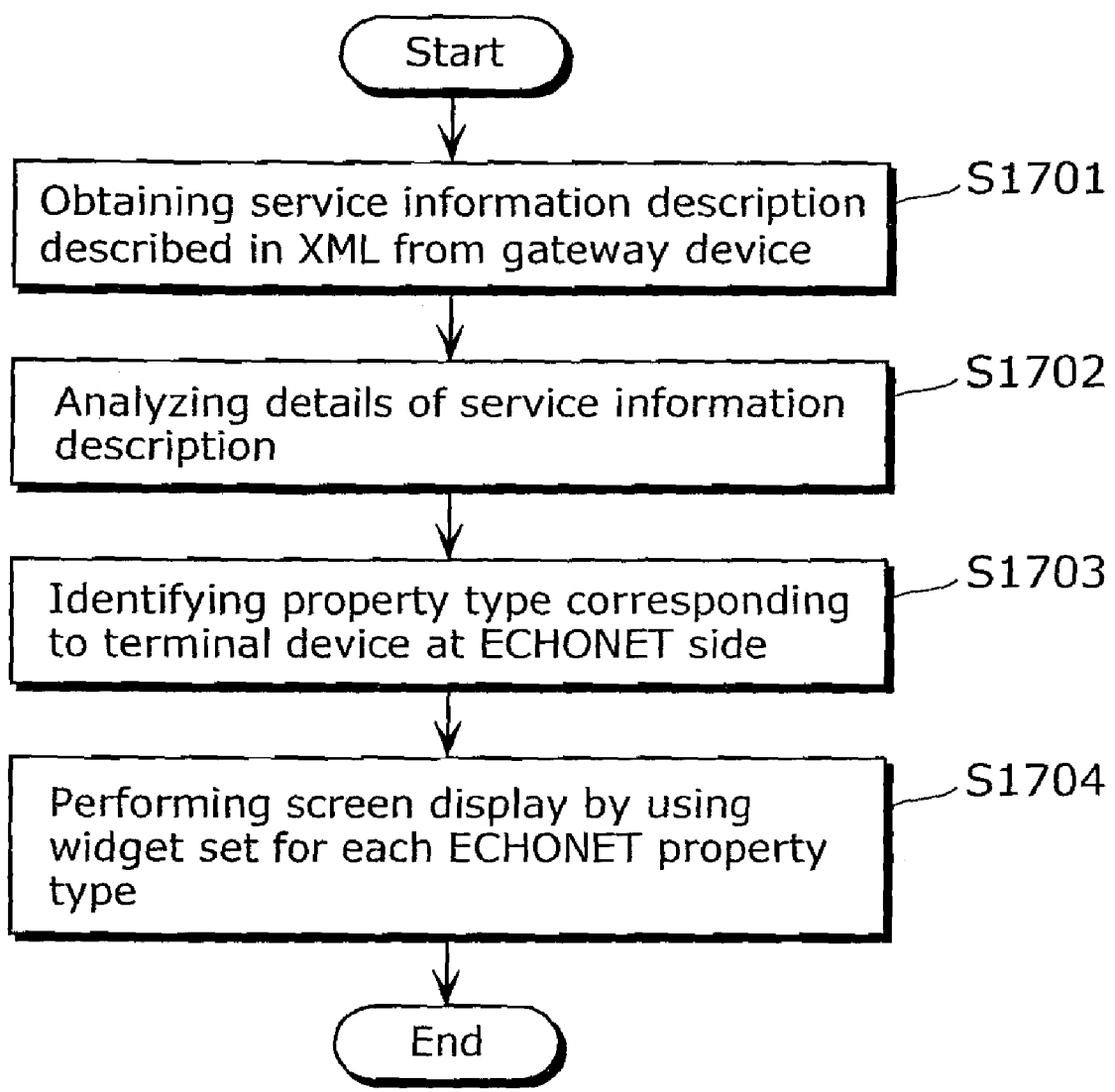
FIG. 17 is a flowchart showing an operation procedure of a screen display of the control device in the second embodiment.

FIG. 17 is a flowchart showing an operation procedure in a screen display of the control device 14 according to the second embodiment.

First, service information description described in XML is obtained from the gateway device (S1701). Next, details of the service information description is analyzed (S1702), and an ECHONET property type corresponding to a terminal appliance at the ECHONET side is identified (S1703). Then, a screen display is performed by using a widget set for each ECHONET property type (S1704).

As described above, according to the second embodiment, the control device can freely generate a screen, as long as it holds a widget set for every ECHONET property that is a control model. Therefore, a screen which displays a state of the appliance and controls the appliance can be easily generated even in an appliance connected to a network for every protocol.

Third Embodiment

The third embodiment of the present invention is described hereinafter with reference to the diagrams.

Figure 9:
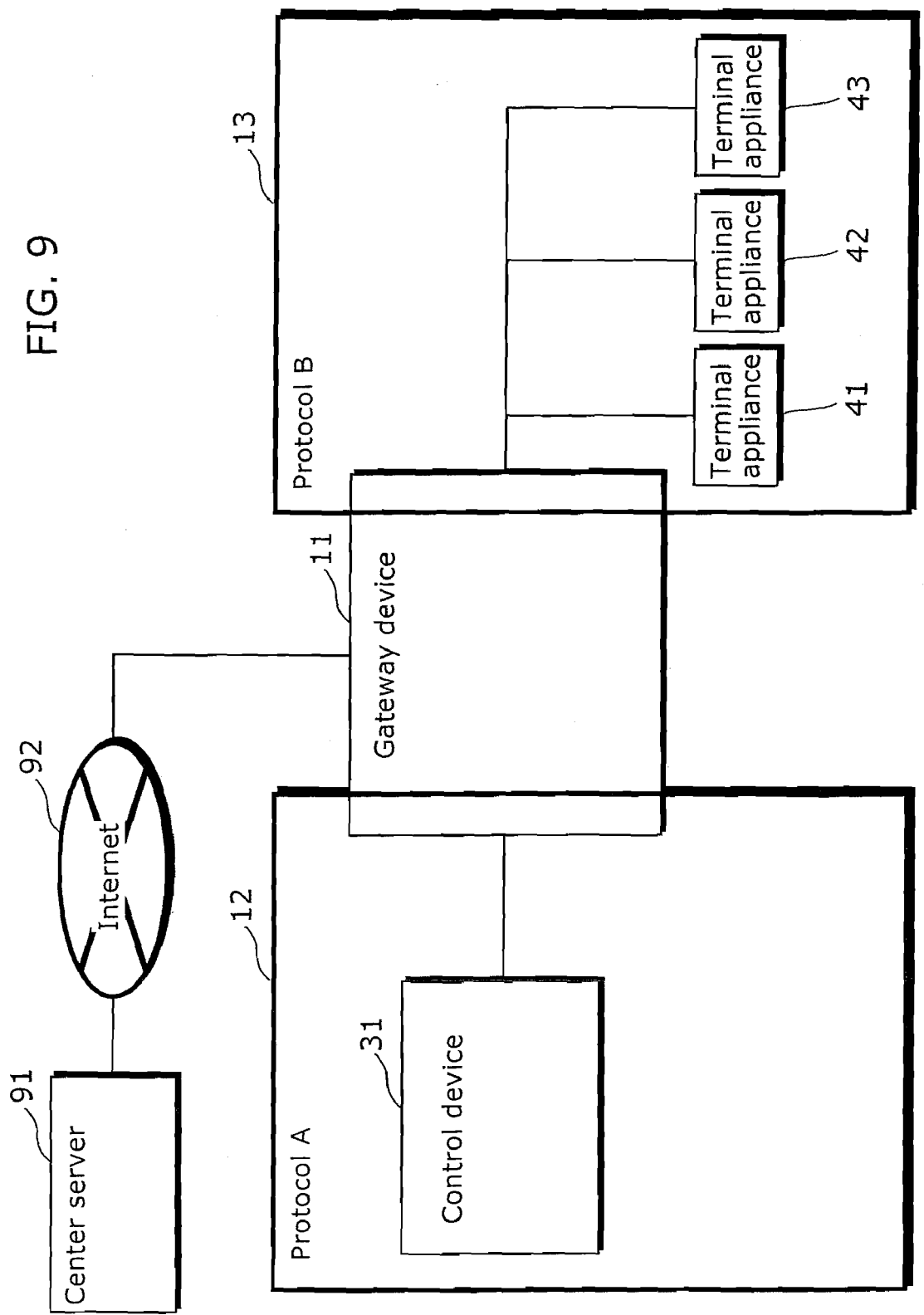
FIG. 9 is a system block diagram in the case of connecting to a server that is outside of a home.

FIG. 9 is a system block diagram of a home network having plural kinds of protocols as a home network according to the third embodiment of the present invention.

The gateway device 11 receives from a center server 91 through the Internet 92: the protocol conversion table 51 regarding an appliance name; a conversion table 61 regarding an attribute and data commonly used in every appliance; and a conversion table 71 regarding an attribute and data for each appliance, and updates each table held in the protocol conversion table holding unit 28.

Similarly, when the gateway device 11 receives a template of device information data from the center server 91 through the Internet 92, the device description template holding unit 25 updates the template, or adds the received template as a new template.

In addition, when the gateway device 11 receives a template of service information data from the center server 91 through the Internet 92, the service description template holding unit 19 updates the template of the service information data, or adds the received template as a new template of the service information data.

As described above, according to the third embodiment, the gateway device 11 can realize an interconnection between different kinds of networks just by adding a protocol conversion table, a template of device information data, and a template of service information data, even in the case where a kind, an attribute, data of an appliance to be controlled are increased or modified.

INDUSTRIAL APPLICABILITY

The gateway device of the present invention is useful as a device which connects networks, for example, in home network systems where different kinds of protocols are present.

The invention claimed is:

1. A gateway device connecting a plurality of networks utilizing different protocols, the protocols including at least a first protocol and a second protocol, said gateway device comprising:
    a template holding unit holding a template (i) described based on a standard used by the second protocol, and (ii) for having information regarding a terminal appliance written therein, the terminal appliance being connected to a network, of the plurality of networks, that utilizes the first protocol;
    an obtainment unit obtaining, from the terminal appliance connected to the network utilizing the first protocol, the information regarding the terminal appliance, the information regarding the terminal appliance being based on a standard used by the first protocol;
    a template description creation processing unit creating a terminal appliance information description by (i) obtaining the template held in said template holding unit, and (ii) writing the information regarding the terminal appliance in the template;
    a protocol conversion table holding unit holding a protocol conversion table, the protocol conversion table storing (i) a representative format of the information regarding the terminal appliance in the first protocol, and (ii) a representative format of the information regarding the terminal appliance in the second protocol, such that the representative format of the information regarding the terminal appliance in the first protocol and the representative format of the information regarding the terminal appliance in the second protocol are associated with a name of the terminal appliance;
    a protocol conversion unit performing a protocol conversion when a control device connected to a network, of the plurality of networks, that utilizes the second protocol performs communications with the terminal appliance connected to the network utilizing the first protocol, the protocol conversion being performed by referring to the protocol conversion table; and
    a communication unit transmitting the terminal appliance information description to the control device connected to the network utilizing the second protocol, the terminal appliance information description being updated by said template description creation processing unit.

2. The gateway device according to claim 1, further comprising a device configuration management unit managing a configuration of the terminal appliance connected to the network utilizing the first protocol.

3. The gateway device according to claim 1,
    wherein said template holding unit includes:
        a device description template holding unit holding a device description template (i) described based on the standard used by the second protocol, and (ii) for having device information of the terminal appliance connected to the network utilizing the first protocol written therein; and
        a service description template holding unit holding a service description template (i) described based on the standard used by the second protocol, and (ii) for having service information provided by the terminal appliance connected to the network utilizing the first protocol written therein, and
    wherein said template description creation processing unit includes:
        a device description creation processing unit creating a device information description by (i) obtaining the device description template from said device description template holding unit, and (ii) automatically writing the device information of the terminal appliance in the device description template according to a predetermined rule; and
        a service description creation processing unit creating a service information description by (i) obtaining the service description template from said service description template holding unit, and (ii) automatically writing the service information provided by the terminal appliance in the service description template according to the predetermined rule.

4. The gateway device according to claim 3, wherein the device information description created by said device description creation processing unit is released to the control device connected to the network utilizing the second protocol, as the device information of the terminal appliance, via said communication unit, the device information description describing a network system utilizing the first protocol as a root device and the terminal appliance connected to the network utilizing the first protocol as a built-in device.

5. The gateway device according to claim 3, further comprising an Internet connection unit connecting to the Internet and obtaining, from a server device, the protocol conversion table, the device description template, and the service description template respectively corresponding to the terminal appliance connected to the network utilizing the first protocol.

6. The gateway device according to claim 3,
wherein said service description template holding unit holds a plurality of service description templates, such that a service description template of the plurality of service description templates is defined by each of a plurality of property types and is a control model categorized into a pattern of controlling the terminal appliance connected to the network utilizing the first protocol, and
wherein said service description creation processing unit categorizes information regarding a service and obtained by said obtainment unit into at least one of the plurality of property types, each of the plurality of property types being previously defined according to a predetermined rule, such that said service description creation processing unit selects, from the plurality of service description templates held by said service description template holding unit, a service description template corresponding to each of the plurality of property types, and creates the service information description according to a rule defined for each of the plurality of service description templates.

7. The gateway device according to claim 6, wherein the plurality of property types includes at least one of the following:
(1) a numeric value type indicating a property value by a numeric value;
(2) a date type holding data indicating a date;
(3) a time type holding a time and a duration;
(4) a level type referring to (i) a magnitude relationship expressed by a non-numeric value, or (ii) a state of the terminal appliance connected to the network utilizing the first protocol;
(5) a character representation type, in which (i) data obtained from the terminal appliance connected to the network utilizing the first protocol is a character string, or (ii) data that controls the terminal appliance is a character string;
(6) a reset type, which resets a certain state of the terminal appliance by controlling the terminal appliance connected to the network utilizing the first protocol using a single defined value;
(7) a switch type, in which (i) the terminal appliance connected to the network utilizing the first protocol is controlled by switching two values, or (ii) one of the two values is obtained from the terminal appliance; and
(8) a selection type, in which (i) the terminal appliance connected to the network utilizing the first protocol is controlled by selecting a value from among three or more values, or (ii) one of three or more values is obtained from the terminal appliance.

8. The gateway device according to claim 6, wherein said service description template holding unit holds the plurality of service description templates for creating the service information description, the plurality of service description templates having, as the plurality of property types, at least one of (i) values of on-off switch type data, (ii) values of listing type data, (iii) values of analog numeric value type data, (iv) values of step value type data, and (v) values of a template comprised of a plurality of attributes.

9. A home network system comprising:
a terminal appliance connected to a network utilizing a first protocol;
a control device connected to a network utilizing a second protocol; and
a gateway device connecting the network utilizing the second protocol with the network utilizing the first protocol,
wherein said gateway device includes:
a template holding unit holding a template (i) described based on a standard used by the second protocol, and (ii) for having information regarding said terminal appliance connected to the network utilizing the first protocol written therein;
an obtainment unit obtaining, from said terminal appliance connected to the network utilizing the first protocol, the information regarding said terminal appliance, the information regarding said terminal appliance being based on a standard used by the first protocol;
a template description creation processing unit creating a terminal appliance information description by (i) obtaining the template held in said template holding unit, and (ii) writing the information regarding said terminal appliance in the template;
a protocol conversion table holding unit holding a protocol conversion table, the protocol conversion table storing (i) a representative format of the information regarding said terminal appliance in the first protocol, and (ii) a representative format of the information regarding said terminal appliance in the second protocol, such that the representative format of the information regarding said terminal appliance in the first protocol and the representative format of the information regarding said terminal appliance in the second protocol are associated with a name of said terminal appliance;
a protocol conversion unit performing a protocol conversion when said control device connected to the network utilizing the second protocol performs communications with said terminal appliance connected to the network utilizing the first protocol, the protocol conversion being performed by referring to the protocol conversion table; and
a communication unit transmitting the terminal appliance information description to said control device connected to the network utilizing the second protocol, the terminal appliance information description being updated by said template description creation processing unit.

10. The home network system according to claim 9,
wherein said template holding unit of said gateway device includes:
a device information description holding unit holding a device information description regarding device information of said terminal appliance connected to the network utilizing the first protocol, the device information description being based on the standard used by for the second protocol; and
a service information description holding unit holding a service information description regarding a service provided by said terminal appliance, the service information description being based on the standard used by the second protocol,
wherein said template description creation processing unit includes:
a device description creation processing unit generating the device information description by (i) obtaining, from said device information description holding unit, a device description template for creating the device information of said terminal appliance connected to the network utilizing the first protocol, and (ii) automatically describing the device information in the device description template according to a predetermined rule; and a service description creation processing unit generating the service information description by (i) obtaining, from said service information description holding unit, a service description template for creating service information of said terminal appliance connected to the network utilizing the first protocol, and (ii) automatically describing the service information in the service description template according to the predetermined rule, and wherein said control device includes a screen display unit displaying a screen, such that a user can confirm and control a state of said terminal appliance based on the device information description and the service information description of said terminal appliance to be controlled.

11. A network connection method used in a gateway device connecting a plurality of networks utilizing different protocols, the protocols including at least a first protocol and a second protocol, said network connection method comprising:

a template holding step of holding a template (i) described based on a standard used by the second protocol, and (ii) for having information regarding a terminal appliance written therein, the terminal appliance being connected to a network, of the plurality of networks, that utilizes the first protocol;

an obtainment step of obtaining, from the terminal appliance connected to the network utilizing the first protocol, the information regarding the terminal appliance, the information regarding the terminal appliance being based on a standard used by the first protocol;

a template description creation processing step of creating a terminal appliance information description by (i) obtaining the template held by said template holding step, and (ii) writing the information regarding the terminal appliance in the template;

a protocol conversion table holding step of holding a protocol conversion table, the protocol conversion table storing (i) a representative format of the information regarding the terminal appliance in the first protocol, and (ii) a representative format of the information regarding the terminal appliance in the second protocol, such that the representative format of the information regarding the terminal appliance in the first protocol and the representative format of the information regarding the terminal appliance in the second protocol are associated with a name of the terminal appliance;

a protocol conversion step of performing a protocol conversion when a control device connected to a network, of the plurality of networks, that utilizes the second protocol performs communications with the terminal appliance connected to the network utilizing the first protocol, the protocol conversion being performed by referring to the protocol conversion table; and a communication step of transmitting the terminal appliance information description to the control device connected to the network utilizing the second protocol, the terminal appliance information description being updated by said template description creation processing step.

12. A non-transitory computer-readable recording medium having a program recorded thereon, the program for being used in a gateway device connecting a plurality of networks having different protocols, the protocols including at least a first protocol and a second protocol, the program causing a computer to execute a method comprising:

a template holding step of holding a template (i) described based on a standard used by the second protocol, and (ii) for having information regarding a terminal appliance written therein, the terminal appliance being connected to a network, of the plurality of networks, that utilizes the first protocol;

an obtainment step of obtaining, from the terminal appliance connected to the network utilizing the first protocol, the information regarding the terminal appliance, the information regarding the terminal appliance being based on a standard used by the first protocol;

a template description creation processing step of creating a terminal appliance information description by (i) obtaining the template held by said template holding step, and (ii) writing the information regarding the terminal appliance in the template;

a protocol conversion table holding step of holding a protocol conversion table, the protocol conversion table storing (i) a representative format of the information regarding the terminal appliance in the first protocol, and (ii) a representative format of the information regarding the terminal appliance in the second protocol, such that the representative format of the information regarding the terminal appliance in the first protocol and the representative format of the information regarding the terminal appliance in the second protocol are associated with a name of the terminal appliance;

a protocol conversion step of performing a protocol conversion when a control device connected to a network, of the plurality of networks, that utilizes the second protocol performs communications with the terminal appliance connected to the network utilizing the first protocol, the protocol conversion being performed by referring to the protocol conversion table; and a communication step of transmitting the terminal appliance information description to the control device connected to the network utilizing the second protocol, the terminal appliance information description being updated by said template description creation processing step.

* * * * *